United States Patent [19]

Gilmore

[11] 3,985,041

[45] Oct. 12, 1976

[54] NON-CONDUCTIVE PUSH-PULL CABLE

[75] Inventor: William J. Gilmore, Manitou Beach, Mich.

[73] Assignee: American Chain & Cable Company, Inc., Bridgeport, Conn.

[22] Filed: Jan. 7, 1974

[21] Appl. No.: 431,541

[52] U.S. Cl. .............................................. 74/501 P
[51] Int. Cl.² .......................................... F16C 1/10
[58] Field of Search ........... 182/2; 74/501 R, 501 P; 64/2 R; 403/50, 51, 179, 288

[56] References Cited
UNITED STATES PATENTS

| | | | |
|---|---|---|---|
| 3,258,031 | 6/1966 | French | 74/501 P X |
| 3,478,607 | 11/1969 | Arbeitlang | 403/51 X |
| 3,757,895 | 9/1973 | Knutson | 182/2 |

FOREIGN PATENTS OR APPLICATIONS

| | | | |
|---|---|---|---|
| 1,134,347 | 4/1957 | France | 74/501 P |

*Primary Examiner*—Samuel Scott
*Assistant Examiner*—Frank H. McKenzie, Jr.
*Attorney, Agent, or Firm*—Pennie & Edmonds

[57] ABSTRACT

A push-pull cable electrically insulating an operator from an electrically conductive device to which the cable is connected. The cable includes a non-conductive flexible elongated core encased in a non-conductive flexible tubular member. The tubular member has an effective inner diameter which allows movement of the core therethrough.

11 Claims, 4 Drawing Figures

3,985,041

NON-CONDUCTIVE PUSH-PULL CABLE

BACKGROUND OF THE INVENTION

Push-pull cables have been used for producing mechanical movement from a position remote to the location where the mechanical movement is desired. The most notable example of such a device is the cable control on a power lawn mower to control gas flow to the engine. Such cables have an inner wire portion which is able to move within an outer tubular portion. The outer portion is fixed in a relatively stationary position with the wire portion attached for longitudinal movement within the tubular portion. One end of the wire is connected to a lever on the handle of the mower for manual operation. The other end is attached to the device over which control is desired. In a lawn mower, the device is usually a valve in the carburetor. In this manner, movement of the lever causes movement of the wire at the other end of the cable which ultimately produces a corresponding movemenet in the carburetor for controlling flow of gas to the engine. Thus, control over the mower is had from a position remote from the mower itself.

Heretofore, these cables have been made of metallic materials which are electrically conductive. Manually operated electrically conductive cables produce an unsafe situation for the operator who is subjected to an electrical potential. Where the potential is of sufficient magnitude, this matallic cable provides a path for any electric current produced by the potential thereby causing electrocution of the operator in contact with the cable.

SUMMARY OF THE INVENTION

The instant invention relates to a push-pull cable device for electrically insulating an operator manually using the device for remote control. The cabie is made of an elongated flexible non-conductive core encased by a non-conductive flexible tubular sheath. The sheath has an effective inner diameter larger than the outer diameter of the core to allow movement of the core through the sheath. The length of the core is greater than that of the sheath by an amount equal to at least the length of the travel desired for control when used to operate a control mechanism. The sheath includes an inner tubular member circumscribing the core and strands of material helically wound about the tubular member to absorb tensile and compressive loading incurred when the cable is in operation.

DETAILED DESCRIPTION OF THE PREFERRED EMBODIMENT

Figure 1:
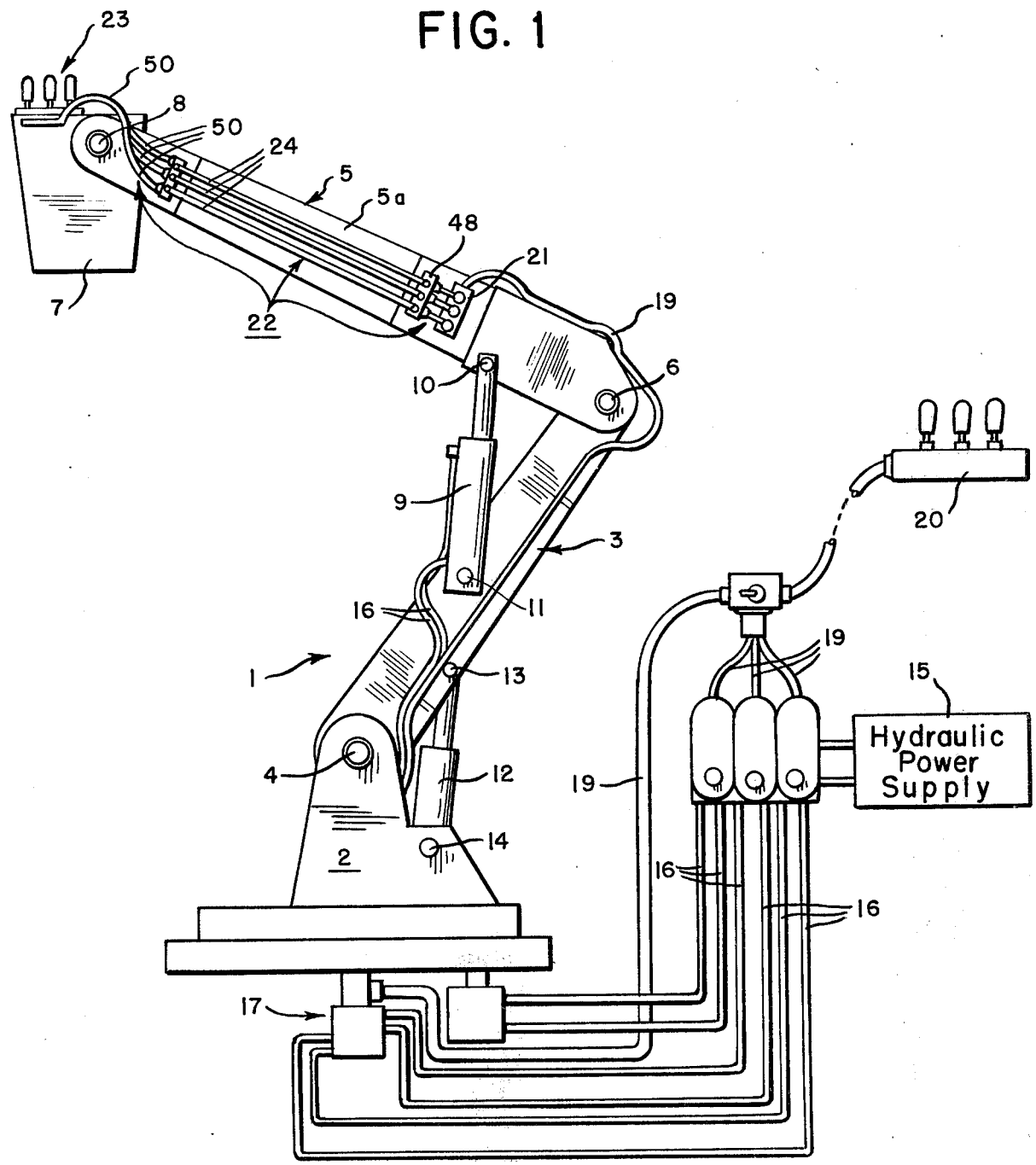
FIG. 1 is an elevated view of a hydraulically controlled aerial life incorporating the flexible non-conductive push-pull cable.

An electrohydraulic aerial lift 1 for moving personnel to different positions above the ground is shown in FIG. 1. The lift shown is of a knuckle boom and bucket construction to provide both vertical and horizontal movement of the bucket. A platform 2 provides the support structure for movable boom elements. A first boom member 3 is pivotally attached at its lower end to the platform 2 at platform pivot 4. A second boom member 5 is pivotally attached to the upper end of the first boom member 3 at pivot 6. A bucket 7 is, in turn, pivotally attached to the other end of a the second boom member 5 at pivot 8.

Controlled movement of the boom members accomplishes positioning of the bucket 7 at a desired location at or above ground level. When the bucket is located on the ground personnel and equipment are loaded into the bucket. Through movement of the boom members the personnel and equipment can be raised to the desired position above ground for working on high voltage wire or the like which are not easily reached for repair without the use of an aerial lift.

Especially when working near high voltage wires, there is present a danger that personnel in the bucket 7 might be electrocuted. To protect the personnel it is advantageous to have the bucket insulated from the remainder of the boom assembly. This is accomplished by having a section of the second boom member 5 made entirely of electrically non-conductive material 5a.

Insulating the bucket in this manner also insulates the personnel therein protecting them from electrocution when subjected to a high electrical potential.

To achieve the desired movement of the boom members hydraulic cylinders are incorporated into the boom and platform structure. An upper hydraulically actuated cylinder 9 is pivotally attached to the boom members intermediate their pivot at 10 and 11. Similarly, a lower hydraulically actuated cylinder 12 is attached to the first boom member 3 intermediate its pivots 4, 6 at point 13 and to the platform at point 14.

Actuation of these hydraulic cylinders produces movement of the boom members for positioning of the bucket 7. Actuation of the lower cylinder 12 independently of the upper cylinder 9 causes the first boom member to rotate about pivot 4 which results in the bucket being moved in a generally horizontal direction. Conversely, actuation of the upper cylinder 9 independently of lower cylinder 12 causes the second boom member 5 to rotate about pivot 6 producing a generally vertical movement of the bucket. If these cylinders are coordinated in their operation, a more refined positioning of the bucket 7 can be obtained.

For delivering hydraulic fluid to the cylinders there is provided a hydraulic power supply 15 which is connected to the cylinders through various pipes 16. Connected to pipes 16 intermediate the power supply 15 and cylinders 9 and 12 is an electrohydraulic valve system 17. Operation of the valve system controls the flow of hydraulic fluid to and from the cylinders 9 and 12 and, thus, ultimately controls the movement of the boom members 3, 5.

The valve system is connected to an electrical remote controller by cables 19 for actuating the valves in the system. A ground level electric controller 20 is located for operation by personnel at the ground level. A boom electrical controller 21 is secured to the second boom member for operation by personnel in the bucket. The boom electrical controller 21 is integrated with push-pull cable elements 22 for producing electrical signals proportional to the displacement of the cable elements 22. The cable elements 22 are, in turn, connected to mechanical levers 23 located in the bucket 7. In this manner, actuation of the mechanical levers 23 results in a corresponding movement of the cable elements 22 to produce from the boom electrical controller a desired electrical signal to the valve system 17. Thus, personnel can control positioning of the bucket at a position remote from the electrical controller 21 simply by moving the mechanical levers 23.

If metallic push-pull cables are used the insulative effect of the non-conductive material 5a is lost as a metallic cable will readily conduct electricity. To overcome this deficiency non-conductive cables 24 are incorporated between the electrical controller 21 and the lever arms 23 for maintaining the insulating effect desired.

Figure 2:
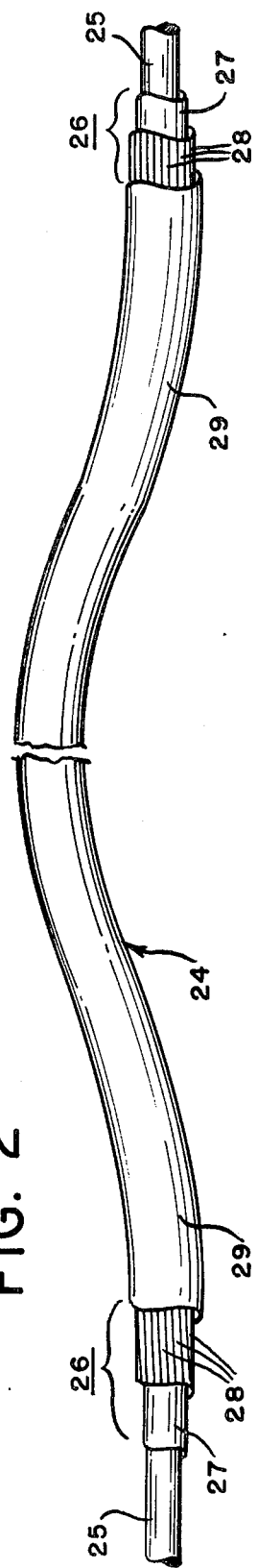
FIG. 2 is a view of an insulated push-pull cable with portions removed to show the various layers of the cable.

A more detailed view of the non-conductive cable is shown in FIG. 2. There, it can be seen that the cable is of a multilayer construction. An innermost member is an actuating core 25 having a cylindrical configuration of constant cross-section along its entire length. The core 25 is made from an extruded plastic material such as polypropylene. A multilayer sheath 26 of flexible non-conductive material encases the core 25.

By having both the core 25 and sheath 26 flexible a smooth relative movement is maintained even when the cable is subjected to bending during actuation. Otherwise, if the sheath 26 were inflexible, a binding would result where the core member is subjected to bending forces during actuation.

The innermost layer of sheath 26 is a thin flexible tubular inner sheath 27 having an inner diameter slightly larger than the outer diameter of the core 25. The inner surface of sheath 27 is smooth to provide a bearing surface on which the core 25 can easily ride. With this configuration the core 25 can easily be moved relative the inner sheath 27 when the push-pull cable is actuated. About the inner sheath 27 several polyester strands 28 are helically wound in a manner which allows each strand to move relative the other when the cable is flexed. The strands 28 are of sufficient strength to absorb the tensile and compressive loads which occur during operation of the cable. The helically wound strands add strength to the cable without loss in flexibility which would occur where such a covering were of a unitary structure.

Over the strands 28 there is outer sheath 29 of flexible extruded polypropylene which covers the strands 26 in a nonadhesive manner. In this way, the outer sheath provides containment of the strands without impairing their relative movement, and it adds strength to the cable assembly. This outer sheath also prevents moisture in the surrounding atmosphere from infiltrating into the interstices of the cable layers. The exterior surface of the sheath is smooth allowing any moisture which may accumulate thereon to run off or evaporate easily.

The prevention of moisture from accumulating in the interior and exterior surfaces of the cable maintains the cable as an electrical insulator. If water or other electrically conductive material were allowed to build up along the length of the cable the insulating effect would be lost as electric current could simply flow in the path created by the accumulated water. When strands 28 are used as described above the moisture prevention feature of outer sheath 29 is amplified. If the strands were exposed the capillary action of the strands would make moisture repelling more difficult. The outer sheath 29 covers the strands and presents a smooth surface more suited for repelling moisture.

Figure 3:
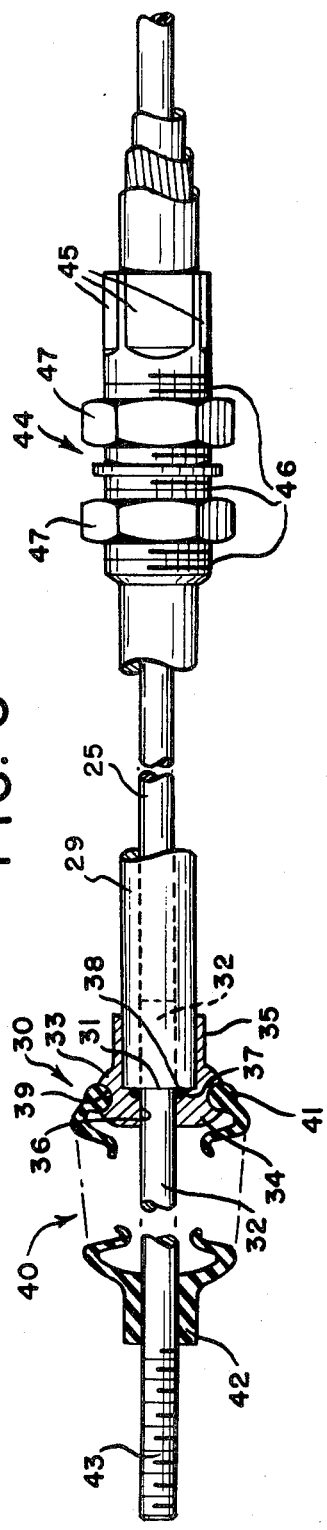
FIG. 3 is a partial view of the push-pull cable integrated with a fitting incorporating sealing means.

One end of the cable 24, as shown in FIG. 3, is connected to an end sealing device 30. To the right of end 31 of the cable 24, as shown in FIG. 3, core 25 is connected to a stainless steel rod 32 which has a diameter equal to that of the core and, in effect, forms an extension thereof. A generally cylindrical steel fitting 33 having a bottom 34 and side walls 35 is clamped over outer sheath 29. The bottom 34 has an orifice 36 which allows movement of rod 32 therethrough. The steel fitting 33 has an internal annular groove 37 for receiving an elastomeric o-ring seal 38. As can be seen in FIG 3, the steel fitting 33 is secured to cable such that the o-ring seal 38 is held in abutting engagement with end 31 of the cable 24, rod 32, and internal groove 37. By sealing the end of the cable in this manner moisutre and other electrically conductive material is prevented from entering the end of the cable.

Steel fitting 33 is also provided with external annular groove 39 for receiving a convoluted tubular bellows 40. The bellows has a groove end 41 configured to fit within the external annular groove 39 for attaching the bellows 40 to the steel fitting 33. The other end of the bellows 40, rod end 42, is fixedly attached to rod 32 at a position to the left of steel fitting 33. In this manner movement of the rod for actuation results in a corresponding movement of the bellows. Thus, the bellows provides an additional seal where there is no sliding engagement with the rod 32 as there is with o-ring seal 38. Thus, bellows 40 in combination with o-ring seal 38 provide double protection for preventing moisture from entering the cable.

A portion of rod 32 extending beyond the rod end 42 of bellows 40 is threaded for attaching the rod to any desired mechanism. In FIG. 1 a portion of the cable having the steel fitting 33 attached thereto is connected to boom member 5 near electric controller 21. In this position a threaded portion 43 of rod 32 is threadably attached to that portion the electrical controller which produces a proportional mechanical movement.

To the right of the fitting 30 there is provided on the outer sheath an adaptor 44 for connecting the cable assembly to the boom member 5. The adaptor is crimped onto the outer sheath as shown by hexagon crimp 45. The adaptor has threaded portion 46 on which are threadably secured two nuts 47. A bracket 48 is attached to boom member 5 for receiving the adaptor 44. In attaching the cable assembly to bracket 48 the nuts 47 are screwed down in tight engagement on either side of bracket 48.

The other end of the cable assembly is provided with an adaptor assembly 49 for connecting the non-conductive push-pull cable to a standard metallic type push-pull cable 50. The adaptor assembly 49 includes a threaded metal fitting 50' crimped on to the end of the non-conductive push-pull cable. This metal fitting 50' has a cylindrical cup member 51 which fits over the other end of the non-conductive cable assembly. The cup member 51 defines a bottom 52 and sidewall 53. The bottom 52 has an orifice 54 for allowing the core 25 to pass therethrough. Also an internal annular groove 55 is defined in bottom 52 for receiving an o-ring seal 55' to seal the cable assembly.

Figure 4:
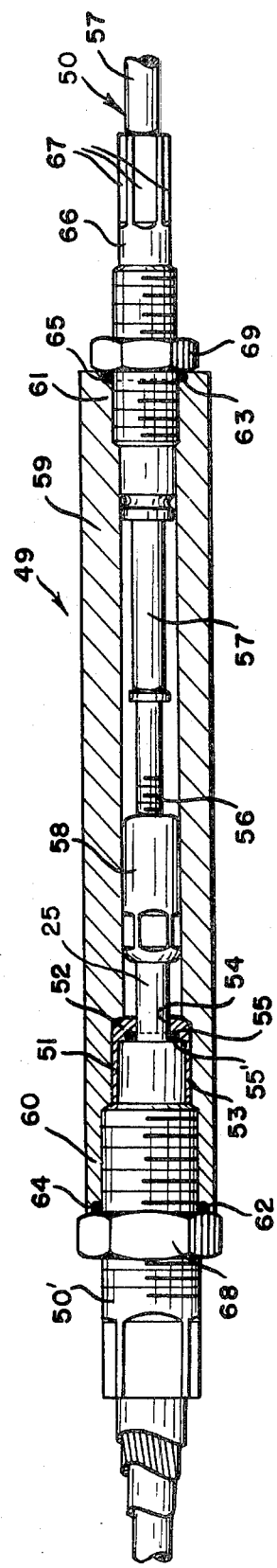
FIG. 4 is a partial view of the push-pull cable having a fitting for connecting the non-conductive cable of FIG. 1 to a standard metallic push-pull cable.

The metallic cable assembly 50 to which non-conductive cable is attached includes a metallic core 56 encased by housing 57. An end of metallic core 56 extending beyond housing 57 is threaded for securing it to core 25. Attached, as by crimping, to the other end of the non-conductive core 25 is a cap adaptor 58 which is tapped to receive a threaded end of metallic core 56. The adaptor assembly includes a steel tube 59 for connecting the housing 57 to sheath 26. The steel tube 59 is internally threaded at both ends 60, 61. The ends 60, 61 define internal annular grooves 62, 63 for receiving elastomeric o-ring seals 64, 65. For securing the metallic cable assembly 50 to the steel tube 59 a threaded fitting 66 is crimped onto housing 57 as shown in FIG. 4 by hexagon crimp 67. Both threaded fittings 50', 66 have lock nuts 68, 69 threadably engaged with its respective fitting.

To attach the non-conductive cable assembly to the metallic cable assembly the core member 56 of the metallic assembly is threaded into cap adaptor 58. The metal fitting 50' is then threaded into the steel rod 59 while the o-ring seal 64 is in place. Lock nut 68 is then moved down in abutting relationship against the o-ring seal 64 and the steel rod 59 to hold the seal in place and maintain the cable in secured relationship to the steel tube 59. Similarly, the metallic cable assembly fitting 66 is threaded into the end 61 of the steel tube 59. A lock nut 69 is then screwed down with the o-ring seal 65 in place to maintain the o-ring seal in proper position and secure the metallic cable assembly in proper disposition with respect to the steel tube 59. The above assembly, in addition to providing a means for attaching a non-conductive push-pull cable to a standard push-pull cable also seals the non-conductive cable from moisture.

With the above assembly the non-conductive push-pull cable 24 can readily be attached to the standard metallic type push-pull cable 50. As shown in FIG. 1 the standard type push-pull cable 50 is connected to the lever arms 23 at one end and the non-conductive push-pull cables 24 at the other. In this manner, the non-conductive push-pull cables can readily be inserted or withdrawn from the boom member 5 when desired for repair or replacement.

The configuration described above provides a flexible cable for operating the electrical controller while completely insulating the operator from electrocution. The cable configuration is one which achieves the desired flexibility without loss in compressive or tensile strength characteristics. Seal means are incorporated in the non-conductive cables to prevent moisture or other electrically conductive material from entering into the interstices of the cable assembly. Thus, the cable assembly described above is one which provides a safe and efficient method of transferring mechanical motion from lever arms on the bucket to the electric controller which is remote from the bucket.

I claim:
1. A push-pull cable comprising:
   a. a core of electrically non-conductive flexible, elongated material having a predetermined effective outer diameter;
   b. an electrically non-conductive flexible inner sheath encasing said core;
   c. said inner sheath having an inner diameter slightly larger than the outer diameter of said core to allow longitudinal movement of the core relative the inner sheath;
   d. said sheath being covered by electrically non-conductive strands of material helically wrapped about said inner sheath for absorbing compressive and tensile loading by operation of the cable;
   e. an outer sheath of non-conductive material covering said strands and said inner sheath, said outer sheath being formed from a material for preventing moisture from passing through said outer sheath; and
   f. seal means between said core and said outer sheath for preventing moisture from entering the interstices defined between said core and said outer sheath.

2. The cable according to claim 1 wherein said seal means includes at least one elastomeric o-ring seal.

3. The cable according to claim 2 further comprising a bellows member attached to at least one end of said cable for additionally sealing said cable.

4. The cable according to claim 3 wherein said bellows has one end fixedly attached to said outer sheath and another end fixedly attached to said core.

5. The cable according to claim 4 further comprising adaptor means at one end of said cable for connecting said cable to a metallic push-pull cable.

6. Cable according to claim 5 wherein said seal means is incorporated into said adaptor means, and said seal means includes an elastomeric o-ring seal and means for holding said o-ring seal in abutting engagement with said core for sealing the area defined between said sheaths and said core.

7. The cable according to claim 6 wherein said metallic cable includes a housing and a metallic core, said adaptor means comprises;
   a. means for securing said housing to said sheaths;
   b. means for securing said non-conductive core to said metallic core.

8. A push-pull cable comprising;
   a. a core of non-conductive flexible elongated material having a predetermined effective outer diameter;
   b. an electrically non-conductive flexible inner sheath encasing said core;
      i. said inner sheath having an inner diameter slightly larger than the outer diameter of said core to allow longitudinal movement of the core relative said inner sheath;
      ii. said inner sheath defining a smooth inner surface on which said core can ride;
   c. several strands of polyester material helically wrapped about said inner sheath for absorbing compressive and tensile loads caused by operation of the cable;
      i. said strands being wrapped in a non-adhesive relation to said inner sheath and to each other;
   d. an outer sheath of flexible non-conductive material covering said strands in a non-adhesive relation, said outer sheath being of a material for preventing moisture from passing through said outer sheath;
   e. one end of said non-conductive cable having sealing means for sealing interstices defined by said core, said inner sheath, said strands, and said outer sheath from moisture;
      i. said sealing means including an elastomeric o-ring seal held in abutting engagement with said non-conductive core and a bellows secured at one end to said outer sheath and at the other end to said non-conductive core; and
   f. the other end of said cable having adaptor means for attaching said cable to a metallic push-pull cable;

i. said adaptor having seal means for sealing said interstices;
ii. said seal means including at least one elastomeric o-ring seal.

9. A push-pull cable having a bellows device for sealing the end of said cable from moisture comprising;
   a. a cable having a core and a sheath encasing said core;
   b. said sheath having a diameter slightly larger than said core for allowing the core to move relative to said sheath;
   c. said cable having at one end thereof the core extending beyond the end of said sheath;
   d. said bellows being of flexible convoluted construction and having a groove end and a rod end;
   e. said groove end fixedly and sealably attached to said sheath;
   f. said rod end fixedly and sealably attached to said rod.

10. The cable according to claim 9 further comprising a fitting at said one end, said fitting having an external annular groove for receiving said groove and of said bellows.

11. The cable according to claim 10 wherein said fitting has a bottom with sidewalls extending therefrom, said bottom having an orifice therein for allowing movement of the core therethrough, said bottom defining a groove for receiving an elastomeric o-ring seal and for holding said seal in abutting relationship with said sheath and said core.

* * * * *

UNITED STATES PATENT AND TRADEMARK OFFICE
CERTIFICATE OF CORRECTION

PATENT NO. : 3,985,041
DATED : October 12, 1976
INVENTOR(S) : William J. Gilmore It is certified that error appears in the above–identified patent and that said Letters Patent are hereby corrected as shown below:

Claim 5

Column 6, line 18, "claim 4" should read --claim 1--.

Signed and Sealed this

Fourth Day of January 1977

[SEAL]

Attest:

RUTH C. MASON
*Attesting Officer*

C. MARSHALL DANN
*Commissioner of Patents and Trademarks*